United States Patent
Lee et al.

(10) Patent No.: US 9,241,080 B2
(45) Date of Patent: Jan. 19, 2016

(54) SYSTEM AND METHOD FOR MANAGING AND SHARING IMAGES ON PER ALBUM BASIS

(75) Inventors: Jungmin Lee, Seongnam-si (KR); Bo Yoon Choi, Seongnam-si (KR); Hyun Jung Lim, Seongnam-si (KR); Byoung Chan Woo, Seongnam-si (KR)

(73) Assignee: NHN CORPORATION, Gyeonggi-Do (KR)

( * ) Notice: Subject to any disclaimer, the term of this patent is extended or adjusted under 35 U.S.C. 154(b) by 652 days.

(21) Appl. No.: 13/553,377

(22) Filed: Jul. 19, 2012

(65) Prior Publication Data

US 2013/0021368 A1  Jan. 24, 2013

(30) Foreign Application Priority Data

Jul. 20, 2011 (KR) ........................ 10-2011-0072065

(51) Int. Cl.
*G09G 5/00* (2006.01)
*G06F 15/16* (2006.01)
*G06F 21/00* (2013.01)
*G06K 9/36* (2006.01)
*G06T 1/00* (2006.01)
(Continued)

(52) U.S. Cl.
CPC ........ *H04N 1/00153* (2013.01); *G06F 21/6218* (2013.01); *H04N 1/00137* (2013.01); *H04N 1/00161* (2013.01); *H04N 1/00164* (2013.01); *H04N 1/00177* (2013.01); *H04N 1/00198* (2013.01); *H04N 1/00244* (2013.01); *H04N 1/00307* (2013.01); *H04N 1/00411* (2013.01); *H04N 1/00424* (2013.01); *H04N 1/00432* (2013.01); *H04N 1/00453* (2013.01); *H04N 1/00456* (2013.01); *H04N 1/00474* (2013.01); *H04N 1/00482* (2013.01); *H04N 2201/0096* (2013.01)

(58) Field of Classification Search
CPC ....................... H04N 1/00153; H04N 1/00156
See application file for complete search history.

(56) References Cited

U.S. PATENT DOCUMENTS

| | | | | |
|---|---|---|---|---|
| 8,341,219 | B1 * | 12/2012 | Young | 709/204 |
| 2002/0167538 | A1 * | 11/2002 | Bhetanabhotla | 345/700 |
| 2003/0097410 | A1 * | 5/2003 | Atkins et al. | 709/206 |

(Continued)

FOREIGN PATENT DOCUMENTS

| KR | 1020050055441 | 6/2005 |
|---|---|---|
| KR | 2010-0028553 A | 3/2010 |

OTHER PUBLICATIONS

Sang-Kyun Kim, Jae-Won Lee, Ryong Lee, Eui-Hyeon Hwang, and Min Gyo Chung, User-Friendly Personal Photo Browsing for Mobile Devices, ETRI Journal, vol. 30, No. 3, Jun. 2008, pp. 432-440.*

(Continued)

*Primary Examiner* — Jeffery A Brier
(74) *Attorney, Agent, or Firm* — Harness, Dickey & Pierce, P.L.C.

(57) ABSTRACT

Provided is a system and method for managing images album-by-album. A communication terminal includes a storage device, a management unit configured to manage images stored on the storage device, album-by-album, and a loading unit configured to load images contained in an album into a server corresponding to a host system on a per album basis in response to a user's setting of sharing attribute of the album as shared with another person. An access permission to the album is granted to the another person so that the another person shares the album with the user.

18 Claims, 20 Drawing Sheets

(51) Int. Cl.
*H04N 1/00* (2006.01)
*G06F 21/62* (2013.01)

(56) References Cited

U.S. PATENT DOCUMENTS

| | | | |
|---|---|---|---|
| 2005/0209999 A1* | 9/2005 | Jou | 707/2 |
| 2005/0210409 A1* | 9/2005 | Jou | 715/811 |
| 2006/0101064 A1* | 5/2006 | Strong et al. | 707/102 |
| 2007/0064121 A1* | 3/2007 | Issa et al. | 348/231.2 |
| 2007/0118525 A1* | 5/2007 | Svendsen | 707/9 |
| 2008/0133658 A1* | 6/2008 | Pennington | 709/204 |
| 2008/0288499 A1* | 11/2008 | Choi et al. | 707/9 |
| 2009/0143052 A1* | 6/2009 | Bates et al. | 455/414.2 |
| 2009/0300657 A1* | 12/2009 | Kumari | 719/320 |
| 2011/0273526 A1* | 11/2011 | Mehin et al. | 348/14.01 |
| 2013/0018960 A1* | 1/2013 | Knysz et al. | 709/204 |
| 2013/0174274 A1* | 7/2013 | Friedman et al. | 726/28 |

OTHER PUBLICATIONS

Office Action for Corresponding Korean Patent Application No. 10-2011-0072065 dated May 6, 2015.

* cited by examiner

FIG. 15

SYSTEM AND METHOD FOR MANAGING AND SHARING IMAGES ON PER ALBUM BASIS

CROSS-REFERENCE TO RELATED APPLICATION

This application claims priority from and the benefit of Korean Patent Application No. 10-2011-0072065, filed on Jul. 20, 2011, which is hereby incorporated by reference for all purposes as if fully set forth herein.

BACKGROUND

1. Field

Exemplary embodiments of the present invention relate to a system and method for managing an album that allow a user to manage an image such as a photo, a video, and the like, in a communication terminal album-by-album, and share the image with a friend.

2. Discussion of the Background

A mobile terminal such as a smart phone, a tablet personal computer (PC), and the like is capable of performing an application program which is typically operable in a computer that employs an operating system (OS), and carrying out a data communication function such as Internet access, and the like. The mobile terminal may provide, in addition to a function of phone calling, various additional functions such as a function of taking photos, storing, and reproducing image photos, and the like.

Reference is made herein to Korean Laid-open Patent Publication No. 10-2005-0055441 published on Jun. 13, 2005, which discloses a method of managing photos by moving and storing photos to a computer from a mobile terminal, or by utilizing a server that manages photos so as to resolve an issue of failing to store photos at a desired amount due to a limited storage space when the photos are locally stored.

Most application programs for managing photos taken by a mobile terminal may apply only a scheme of locally storing and managing the saved photos of the mobile terminal, or only a scheme of depositing all photos taken by the mobile terminal on a host system. Local-based programs may allow sharing of photos stored in the mobile terminal with a friend using an e-mail, a messenger service, or by other means. Local-based programs, however, have their limits as a scheme of sharing photos in the mobile terminal with a friend in real time since the photos may be shared only instantly. Server-based programs also have their limits due to a communication state of a mobile terminal since the server-based programs may allow access to the server only through an Internet connection in order to view photos. For example, while a user travels via subway, an Internet connection may be unavailable or unstable, and thus, the user may be unable to view the photo due to the impossibility to access the server.

The present application discloses a system and method that allow a service scheme of locally adding and managing an image on a communication terminal, and loading images in a communication terminal into a server.

The above information disclosed in this Background section is only for enhancement of understanding of the background of the invention, and therefore, it may contain information that does not form any part of the prior art nor what the prior art may suggest to a person of ordinary skill in the art.

SUMMARY

Accordingly, exemplary embodiments of the present invention provide a service model that allows a user to manage photos in a communication terminal album-by-album without restrictions, and share the photos with a friend.

Exemplary embodiments of the present invention also provide a service model that allows the user to manage photos concurrently in a server environment and in a local state.

Exemplary embodiments of the present invention also provide a service model that allows the user to use, album-by-album, a function of setting the attribute of the photos to be shared with friends, a function of editing an image, a function of generating a card, and the like as a batch process.

Exemplary embodiments of the present invention also provide a service model that may provide update information in real time for an album shared between a user and a friend.

Additional features of the invention will be set forth in the description which follows, and in part will be apparent from the description, or may be learned by practice of the invention.

An exemplary embodiment of the present invention discloses a communication terminal, including a storage device, a management unit configured to manage images stored on the storage device, album-by-album, and a loading unit configured to load images contained in an album into a server corresponding to a host system on a per album basis in response to a user's setting of sharing attribute of the album as shared with another person. In this instance, an access permission to the album is granted to the another person so that the another person shares the album with the user.

Another exemplary embodiment of the present invention discloses an album management server including a storage unit configured to receive, album-by-album, images stored in a communication terminal of a user, and store the images to be associated with an album corresponding to an album unit, and store the images to be associated with an album corresponding to an album unit, and a publishing unit configured to publish the album by granting an access permission to the album to another designated person in response to the user's designation of a list of other people to share the album.

Still another exemplary embodiment of the present invention discloses a method using a processor of managing an album in a communication terminal, the method including managing, by the processor, images album-by-album, loading, into a server corresponding to a host system, images contained in an album album-by-album in response to a user setting for sharing the album with another person, receiving, from the server in real time, update information on updates to the album or an image contained in the album performed by the another person, and providing the update information to the user.

Yet another exemplary embodiment of the present invention discloses a method using a processor of managing an album in an album management server, the method including receiving, from a communication terminal of a user, an image classified and managed album-by-album in the communication terminal, and storing the image to be associated with an album corresponding to an album unit, publishing, by the processor, the album by granting an access permission to the album to another designated person in response to the user designating a list of other people to share the album, and providing the user with update information in real time for the album or an image contained in the album.

Further another exemplary embodiment of the present invention discloses a computer-readable recording medium storing an executable program to manage images stored in a communication terminal, which when executed causes the computer to perform a management code configured to classify and manage images album-by-album, a loading code configured to load, into a server associated with the program, images contained in an album album-by-album in response to a user setting for sharing the album with another person, and a feed code configured to receive, from the server in real time, update information on updates to the album or an image contained in the album being performed by the another person, and provide the update information to the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 10 through 15 are diagrams illustrating a display mode for classifying, in various schemes, and displaying photos according to exemplary embodiments of the present invention.

DETAILED DESCRIPTION OF THE ILLUSTRATED EMBODIMENTS

Figure 1:
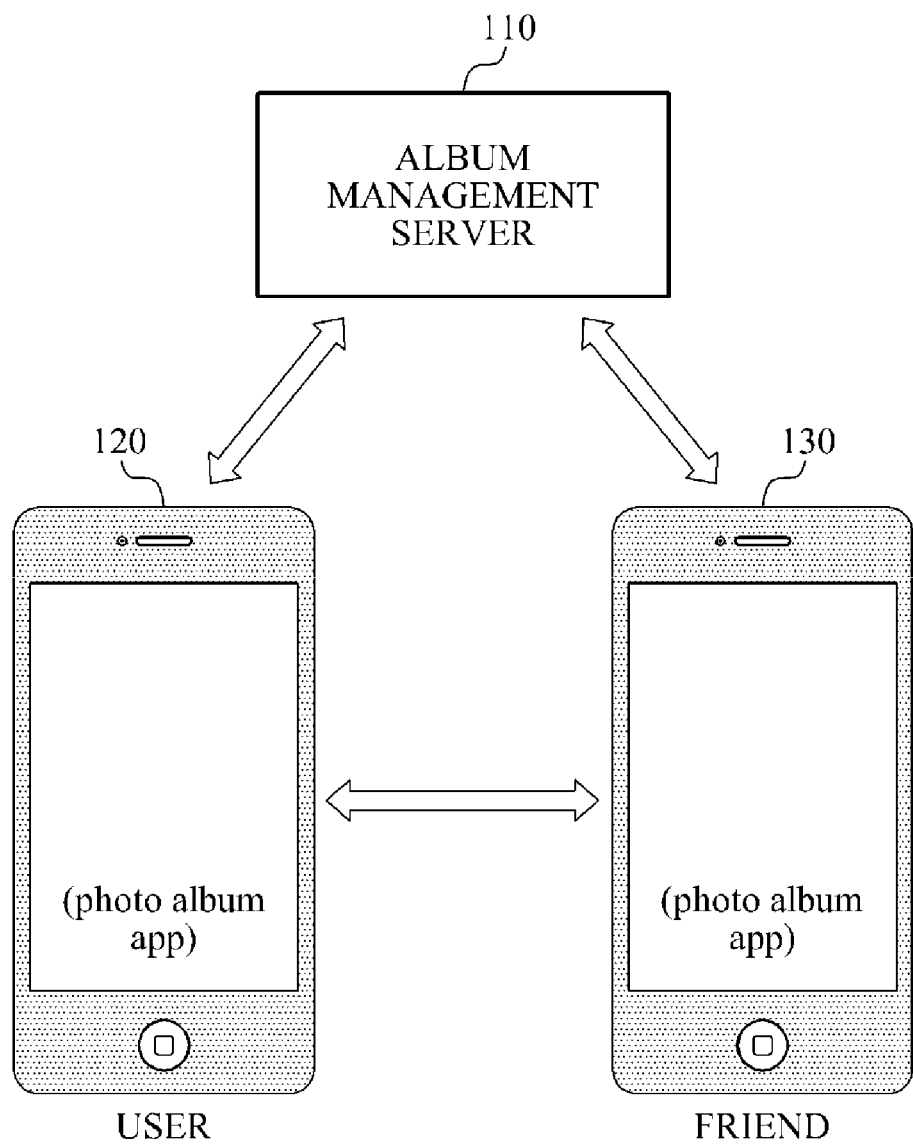
FIG. 1 is a diagram illustrating an overall environment of an album management system according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. In the drawings, like numbers refer to the same or similar functionality throughout the several views. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Throughout the specification, an "image" may refer to an image in a form of a photo, a still image, a moving image, various images, and the like. Hereafter, the photo will be given as a representative example of the image. Further, a "friend" and an "another person" may refer to the same entity which may share a photo of a user through a selection of the user.

FIG. 1 is a diagram illustrating an overall environment of an album management system according to an exemplary embodiment of the present invention. FIG. 1 illustrates a service model for managing, album-by-album or on a per album basis, locally saved photos in a communication terminal of a user 120, and loading the photos, album-by-album or on a per album basis, onto an album management server 110 to share the photos with a friend 130.

According to an exemplary embodiment of the present invention, the album management service may be implemented through a connection between the album management server 110 and a communication terminal of a user, for example, the user 120 or the friend 130. To provide the album management service, exemplary embodiments of the present invention may provide an album management application (hereinafter, referred to as a "photo album application" (app)) that provides a function of managing, album-by-album, photos stored in a communication terminal, and a function of sharing photos with friends album-by-album. In this instance, the photo album app may be implemented as a smart phone application, a feature phone virtual machine (VM), and the like. The user 120 may install the photo album app on the communication terminal of the user 120, thereby adding and managing locally saved photos album-by-album, and sharing the photos with the friend 130 album-by-album via a medium such as an e-mail, a messenger service, and the like. Further, the photo album app may automatically upload, to the album management server 110, a photo stored in the communication terminal which is connected to the album management server 110. The album management server 110 may manage, album-by-album, a photo stored in the communication terminal of the user 120 connected to a communication terminal on which the photo album app is installed, and provide a process of publishing, to the friend 130, an album for which the user 120 sets its attribute as "shared" with the friend 130. The album management server 110 may enable the user 120 and the friend 130 with a permission to access to the album to access the album stored in the server in a web environment as well as a mobile environment through the photo album app.

According to exemplary embodiments of the present invention, the communication terminal may broadly refer to a communication device, such as a personal computer (PC), a smart phone, a tablet PC, and the like, which may install the photo album app, and access the album management server 110. That is, exemplary embodiments of the present invention may provide an album management service of the same function in various platforms such as the PC, the smart phone, the tablet PC, and the like.

A service screen displayed on the communication terminal in relation to the album management service will be described. A configuration or a function of the service screen may vary depending on a user environment or an operating system (OS), for example, Android, WinCE, and the like, of the communication terminal. Hereinafter, a service screen provided by an application for mobile devices will be described as an example of such service screen. However, the service screens are not limited to those shown in figures or exemplary embodiments of the present invention, and the configuration, the function, the flow, and the like of the service screens may be modified.

Hereinafter, an internal configuration and an operation of the communication terminal at a user side and the album management server in the album management system according to exemplary embodiments of the present invention will be described in further detail.

Figure 2:
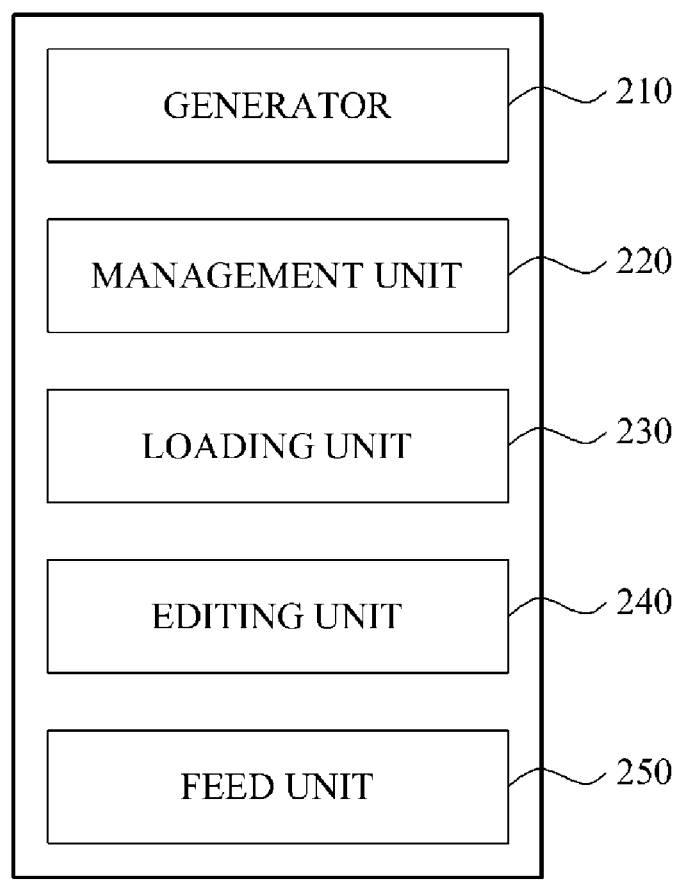
FIG. 2 is a block diagram illustrating an internal configuration of a communication terminal that manages, in an album unit, locally saved photos, and shares the photos with friends according to an exemplary embodiment of the present invention.

FIG. 2 is a block diagram illustrating an internal configuration of a communication terminal which manages locally saved photos album-by-album, and shares the photos with a friend according to exemplary embodiments of the present invention. Referring to FIG. 2, a communication terminal 200 may include a generator 210, a management unit 220, a loading unit 230, an editing unit 240, and a feed unit 250.

Figure 3:
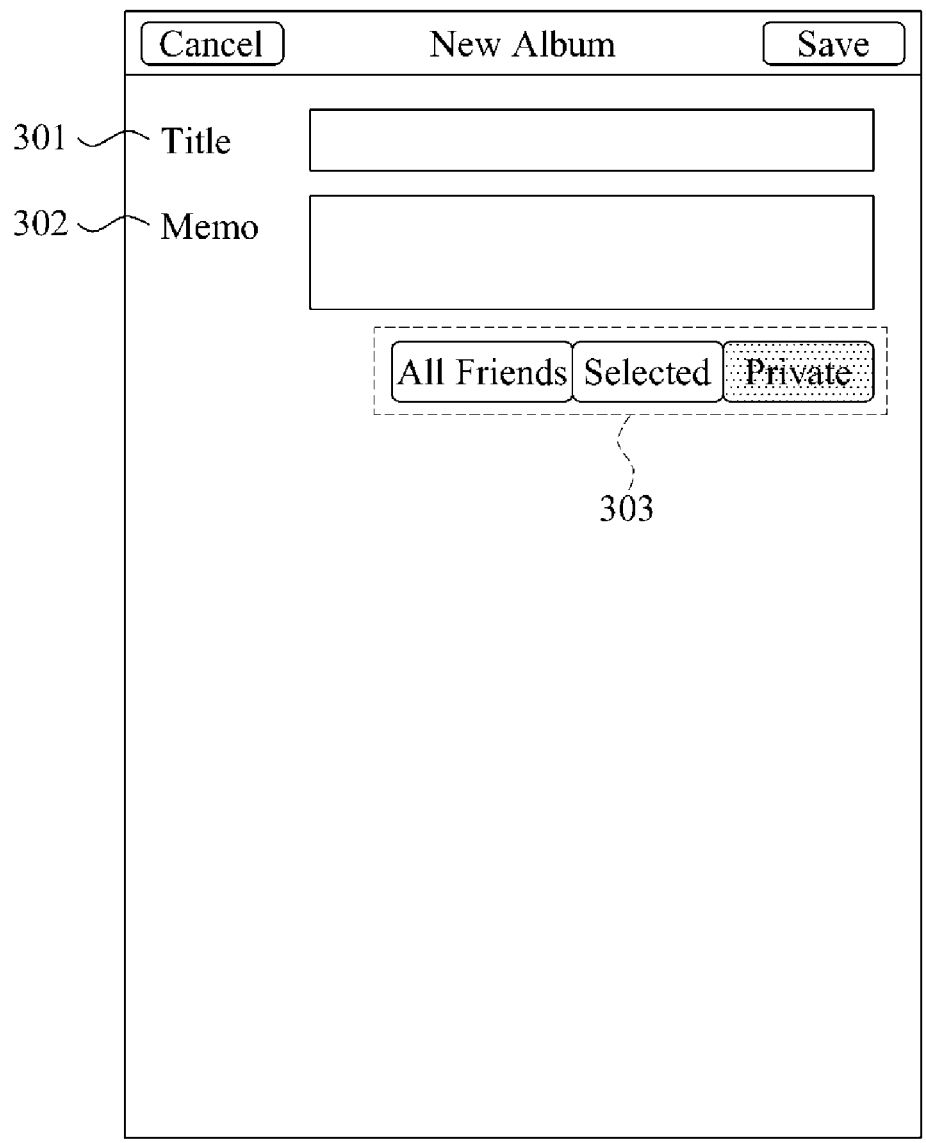
FIG. 3, FIG. 4, FIG. 5, FIG. 6, and FIG. 7 are diagrams illustrating a management mode for batch moving photos classified in various schemes to an album, according to exemplary embodiments of the present invention.

FIG. 3, FIG. 4, FIG. 5, FIG. 6, and FIG. 7 are diagrams illustrating a management mode for batch moving photos classified in various schemes to an album, according to exemplary embodiments of the present invention. The generator 210 may generate an album to manage photos. In this instance, the album may refer to a folder unit to manage photos, which may be directly added or edited by a user. The generator 210 may provide a service screen to generate a new album in response to a request from the user as illustrated in FIG. 3. The service screen may include a title input window 301 to input a title of the album, a memo input window 302 to input a memo related to the album, a publication setting menu 303 to publish the album, and the like. In this instance, the publication setting menu 303 may provide options of "Private" to keep the album from being published, "All Friends" to allow the album to be published to friends contained in a contact list of the communication terminal, and "Selected" to allow the album to be published to predetermined friends. The generator 210 may set a target to share the album by receiving, from the user, an input of a list of friends with whom the album is to be shared, through the publication setting menu 303, and storing the list of friends to be associated with the album. According to exemplary embodiments of the present invention, a function of setting the publication is provided album-by-album. However, a setting for sharing the album, that is, a designation of a target the album is to be shared with may be performed photo-by-photo in the album.

The management unit 220 may perform an overall function of managing photos stored in the communication terminal album-by-album. The management unit 220 may operate in a management mode, a view mode, or the like for the album.

Figure 4:
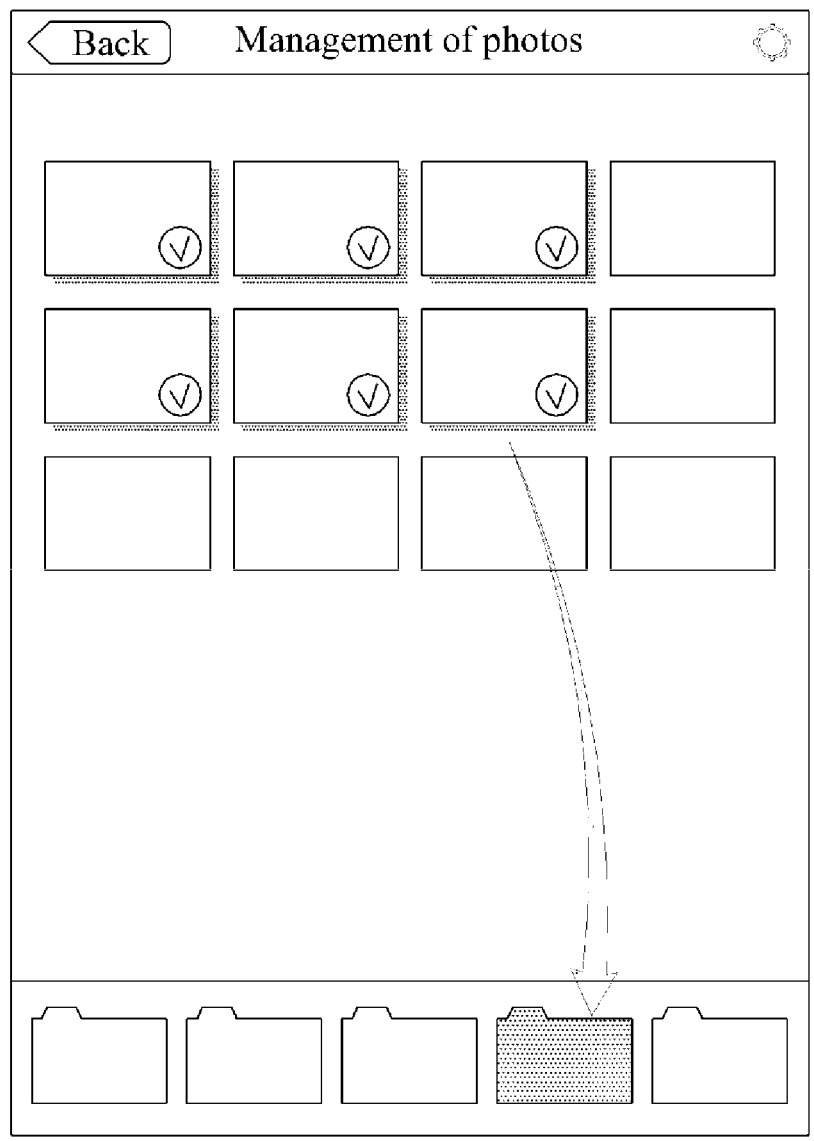

In the management mode, the management unit 220 may classify photos album-by-album, and operate in various schemes using time information, location information, and character information associated with the respective photos. For example, the management unit 220 may provide a management mode for moving a photo selected by the user to a predetermined album, from a full list of photos stored in the communication terminal by providing the full list. Referring to FIG. 4, the management unit 220 may display all photos stored in the communication terminal by automatically sorting the photos in a chronological order of which the photos were taken, and then batch add desired photos selected by the user to the album in response to the user's selection of the desired photos, and dragging and dropping the desired photos onto the album shown at the bottom of the screen. In this instance, in a service screen in the management mode, a list of albums shown at the bottom of the service screen may be scrolled through in a vertical direction, and thus, a relatively large number of albums may be viewed. That is, the management unit 220 may provide a management mode that may allow the user to easily select a relatively large number of albums through an intuitive sorting of photos, and intuitively move the selected photos to a selected album. As another example, the management unit 220 may provide a management mode for classifying and displaying photos region-by-region based on the location information associated with the photos, and moving, in response to the user's selection of a region, a photo from the selected region to a predetermined album. Photos in the latest smart phones may include global positioning system (GPS) information in a photo, and thus, the GPS information contained in the photo may be used as the reference information to classify photos.

Figure 5:
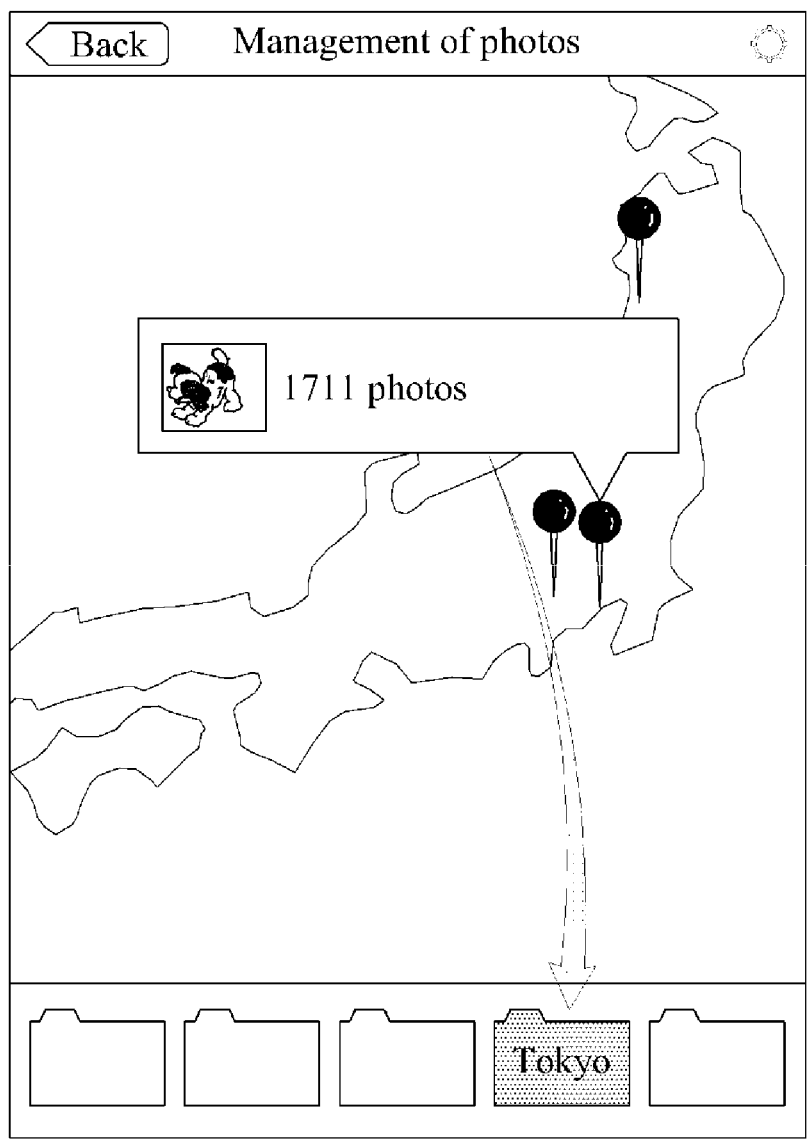
Figure 6:
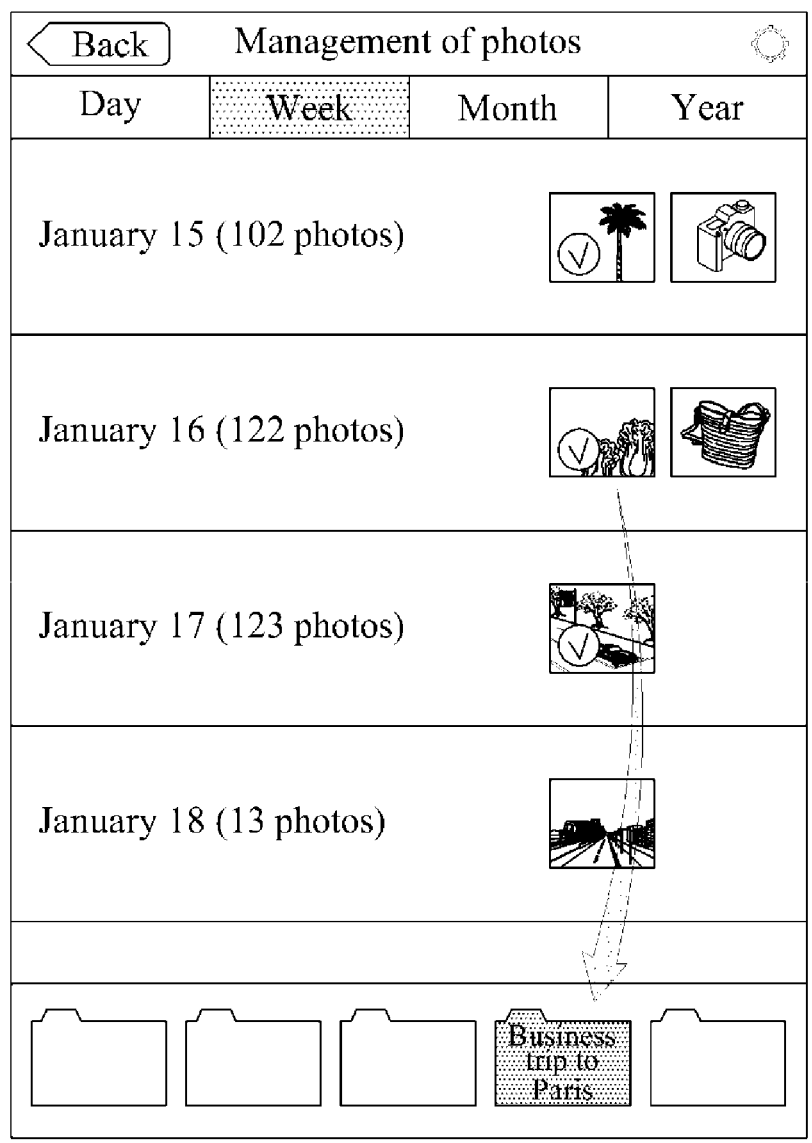
Figure 7:
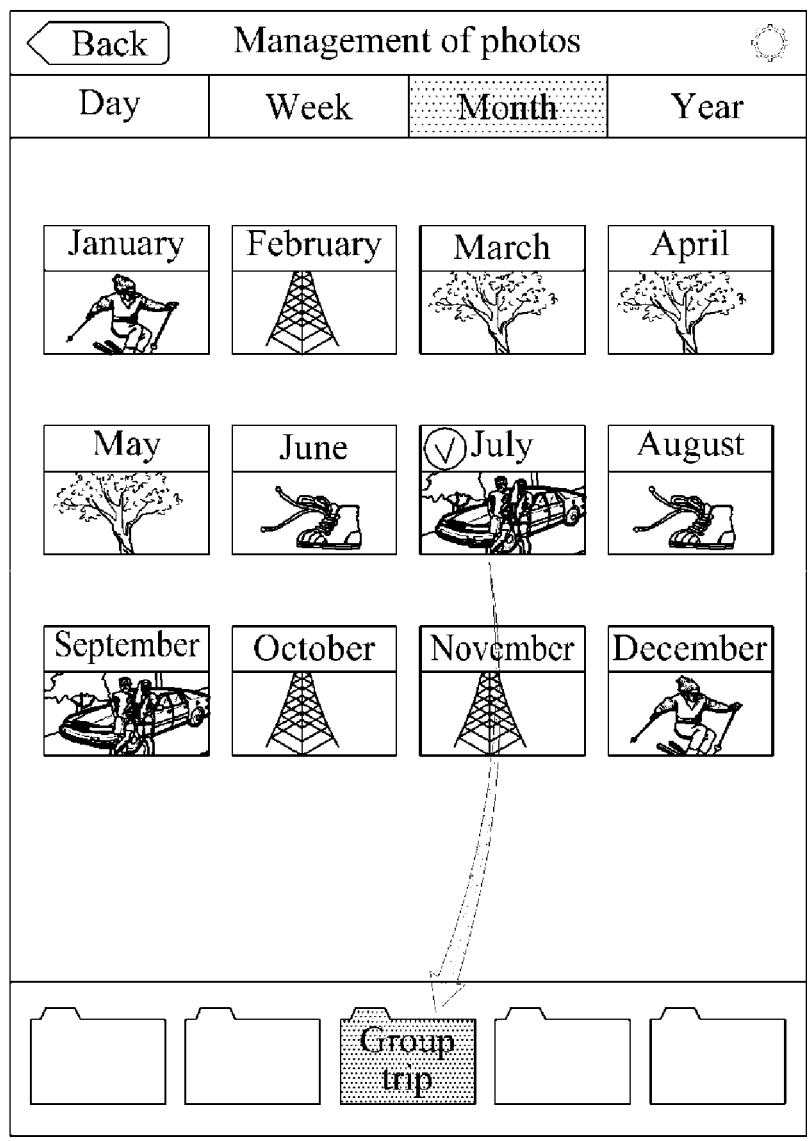

Referring to FIG. 5, the management unit 220 may classify and display, region-by-region, location information included in photos, and then place photos at the respective predetermined locations in the album desired by the user, in response to the user's selection of a predetermined location and dragging and dropping the photo onto an album shown at the bottom of the screen. In this instance, a scheme of batch providing classifications for photos according to a map scale provided by a service, a scheme of the user optionally selecting a classification for photos, and the like, may be applied to the protocol for classifying photos region-by-region. A map screen for receiving a selection of a region by the user may be provided as the service screen of the management mode. In this instance, the map screen may receive a selection of at least one region from the user, and have a pin generated and displayed in a selected area so that the user may easily verify the selected area. In addition to a drag & drop interaction scheme described in the foregoing, the management unit 220 may apply an interaction of changing the map screen to an album list screen which displays the full list of albums in response to a region selected from the map screen, and batch adding photos of the region to the selected album, in response to the user's selection of a desired album from the album list screen. As a still another example, the management unit 220 may provide a management mode for classifying and displaying photos date-by-date based on time information associated with the photo, in particular, displaying photos taken for respective dates selected by the user, and moving, to a predetermined album, a number of desired photos among photos corresponding to the specific date. Referring to FIG. 6, in a service screen of the management mode described in the foregoing, a date unit may be divided into units of years, months, weeks, and days and thus, a date unit screen that allows the user to enter his choice of a date unit may be provided. For example, a portion of photos among photos in a predetermined date unit may be selected and moved to an album, which includes selecting several photos from photos taken, e.g., during a trip to Paris from May 7 to 9, and putting the selected photos in an album named "trip to Paris," or putting a number of photos taken during a workshop held on Thursday and Friday of a previous week in an album named "workshop in 2011", and the like. In this instance, in addition to using a drag & drop interaction scheme of directly moving a photo selected by the user to an album shown at the bottom of the screen, the management unit 220 may apply an interaction of changing the date unit screen to an album list screen which displays a full list of albums in response to the selection of a desired photo from a predetermined date unit, and batch adding photos selected in the predetermined date unit to the selected album, in response to the user's selection of the desired album from the album list screen. As yet another example, the management unit 220 may provide a management mode for classifying and displaying photos date-by-date based on time information associated with the photos, and moving photos in the selected date unit to a predetermined album, in response to the user's selection of a predetermined date unit. Referring to FIG. 7, the management unit 220 may classify and display time information included in the photos on a per date basis, and then move photos corresponding to the predetermined date unit in the album desired by the user onto an album shown at the bottom of the screen, in response to the user's selection of a predetermined date unit and dragging and dropping the photo. That is, photos taken on each date may be automatically classified in a manner similar to a calendar, and photos taken on a predetermined date may be batch placed in a desired album. In a service screen of the management mode described in the foregoing, the date unit may be divided into units of years, months, weeks and days, and a date unit screen for receiving the user's selection of a date unit may be provided. In the management mode, in addition to a drag & drop interaction scheme, an interaction of changing the date unit screen to an album list screen which displays a full list of albums in response to the selection of a predetermined date unit, and batch adding photos selected in the predetermined date unit to the selected album in response to the user's selection of a desired album from the album list screen, may be applied. As further another example, the management unit 220 may provide a management mode for classifying and displaying photos character-by-character based on character information associated with the photos, and moving the photos from the selected character unit to a predetermined album, in response to the user's selection of the predetermined character unit. In the management mode described in the foregoing, a photo may be classified character-by-character by applying a scheme of automatically recommending, through a face recognition module, a name of a friend closest to the corresponding character among friends of the user for each photo, and automatically tagging the corresponding character when a result matches the corresponding character, a scheme of automatically sorting photos, in response to manually selecting a friend in a photo, for each character in an album.

Figure 8:
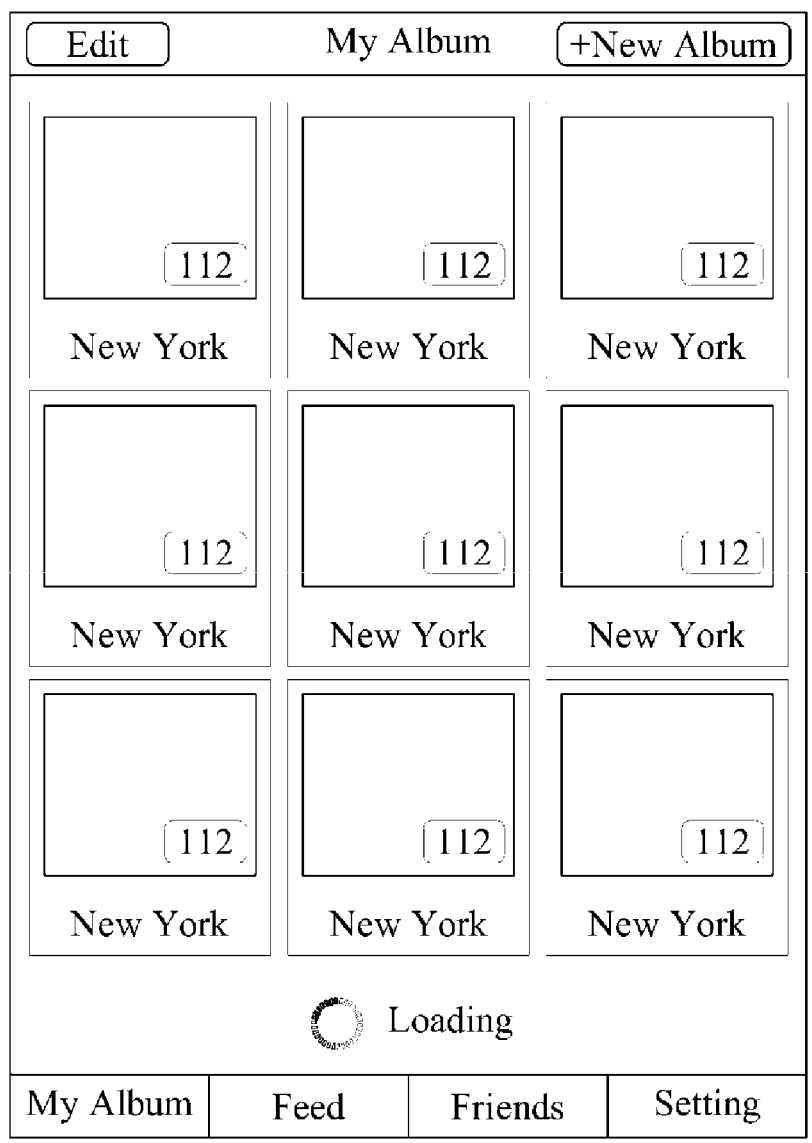
FIG. 8 is a diagram illustrating a viewer mode for displaying a list of albums according to exemplary embodiments of the present invention.

FIG. 8 is a diagram illustrating a viewer mode for displaying a list of albums according to exemplary embodiments of the present invention. The management unit 220 may provide an album list screen which displays a full list of albums in response to a request from the user for management of an album. As illustrated in FIG. 8, in the album list screen, all albums belonging to a certain user may be sorted and displayed according to a predetermined display protocol. In this instance, the album list screen may display albums sorted in an order that the user has made changes to the albums in an editing environment, and a new album may be added at the front of the list. If no changes have been made, a newly generated album or an album having a newly added photo may be sorted and displayed at the front of the list. The album titles entered by the user, the total number of photos contained in the respective albums, and thumbnail images may be displayed for individual albums contained in the list. In this instance, the thumbnail image may be configured as the most recently updated photo, and if the previous thumbnail photo has been deleted, the most recently added photo may become the thumbnail. The management unit 220 may again classify and manage the albums, as folders, whose photos have now been classified. Similar to the management structure of the latest smart phone apps, the album management of at least two depths may be achieved through the album management structure that may sort and classify albums as units.

Figure 9:
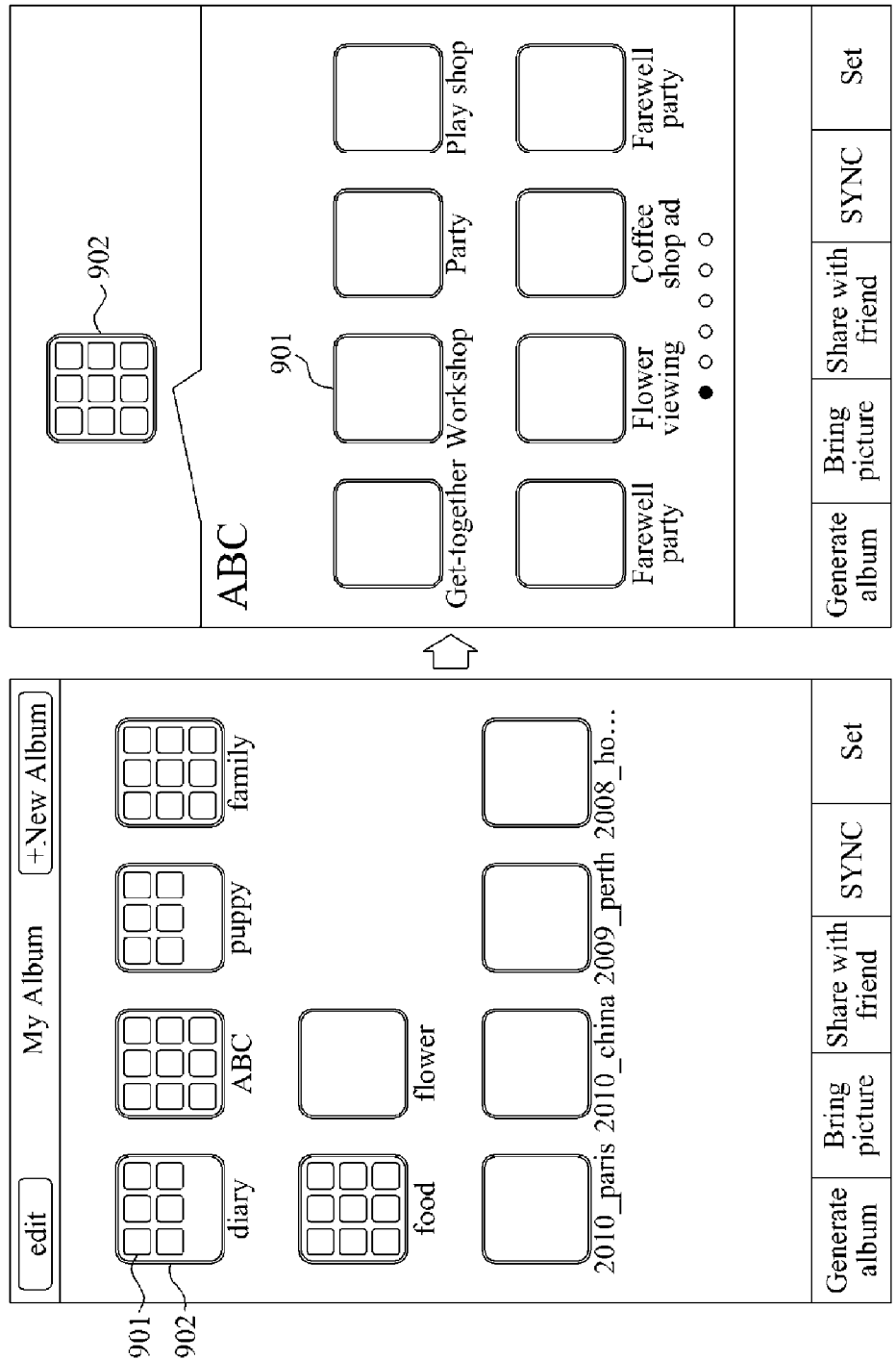
FIG. 9 is a diagram illustrating a configuration for managing albums that manages an album unit put in a folder according to exemplary embodiments of the present invention.

FIG. 9 is a diagram illustrating a configuration for managing albums that manages an album unit put in a folder according to exemplary embodiments of the present invention. As illustrated in FIG. 9, the management unit 220 may provide an environment in which albums 901 are stored in folders 902 according to the intention of the user to classify albums, and the user may open one of the folders 902 to access a desired album 901.

In a viewer mode, the management unit 220 may provide a viewer mode for an album through various types of views such as a general photo view, a location view, a date view, a character view, and the like. As an example, the management unit 220 may provide the viewer mode for simply displaying photos for each album added by the user.

FIGS. 10 through 15 are diagrams illustrating a display mode for classifying, in various schemes, and displaying photos according to exemplary embodiments of the present invention.

Figure 10:
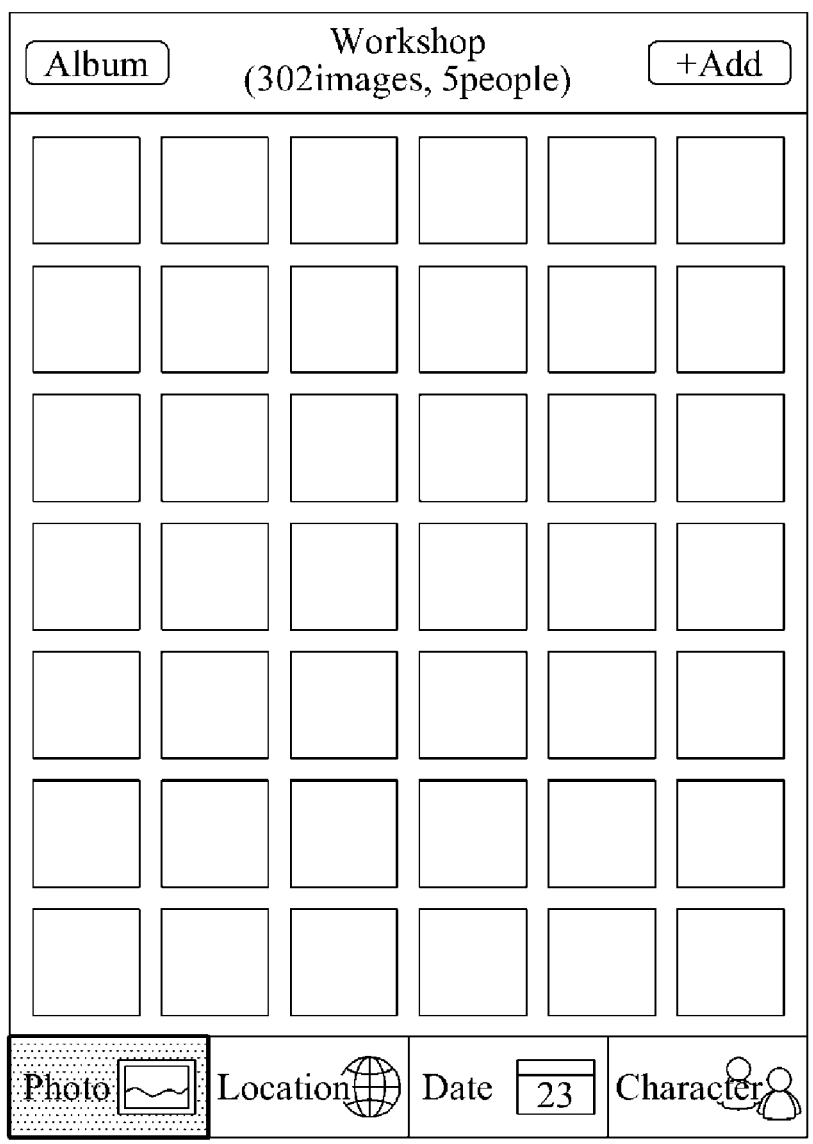

As illustrated in FIG. 10, the management unit 220 may provide a general photo view for sorting and displaying photos for each album added by the user, and the user may verify photos of the corresponding album by selecting the album. As another example, the management unit 220 may provide a viewer mode for classifying and displaying photos region-by-region based on their location information, for example, GPS information associated with the photos.

Figure 11:
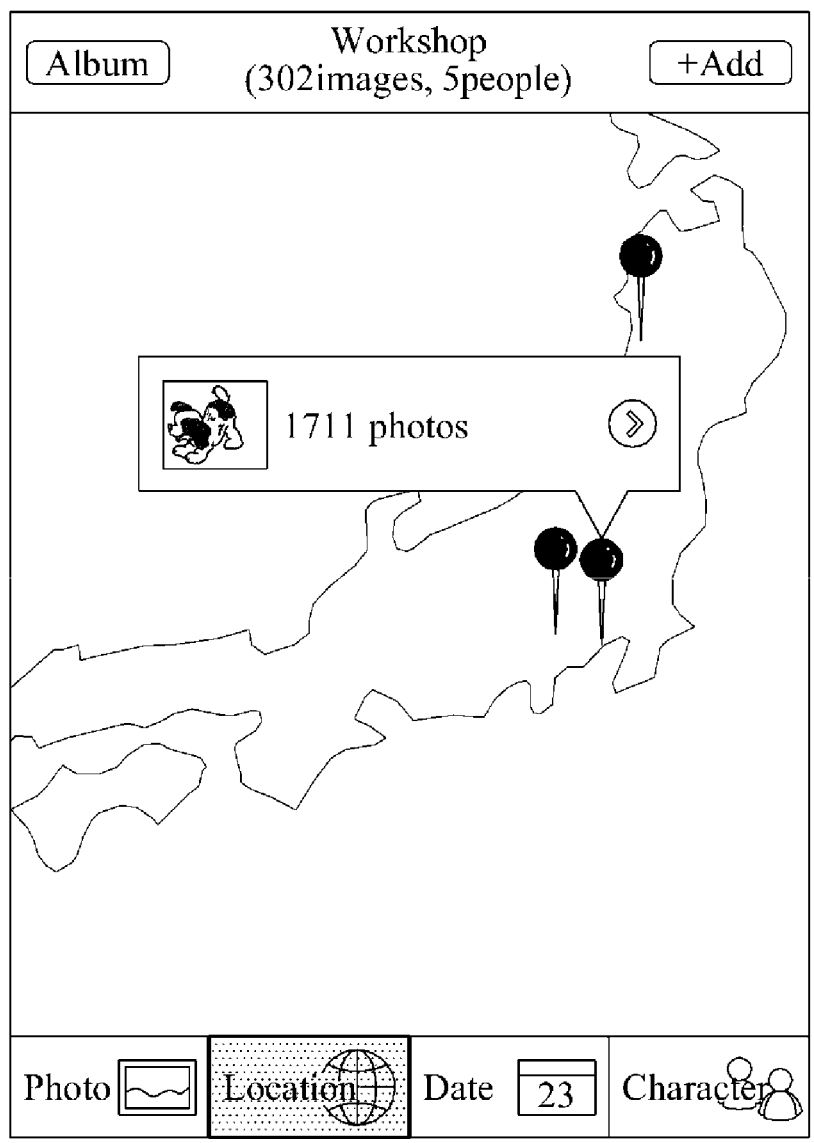

As illustrated in FIG. 11, the management unit 220 may provide a location view for displaying, on a map, locations at which photos were taken by constructing the albums based on regions, and the user may verify whether the respective photo was taken in the corresponding region by selecting a region on the map. As still another example, the management unit 220 may provide a viewer mode for classifying and displaying photos for each date based on time information associated with the photo.

Figure 12:
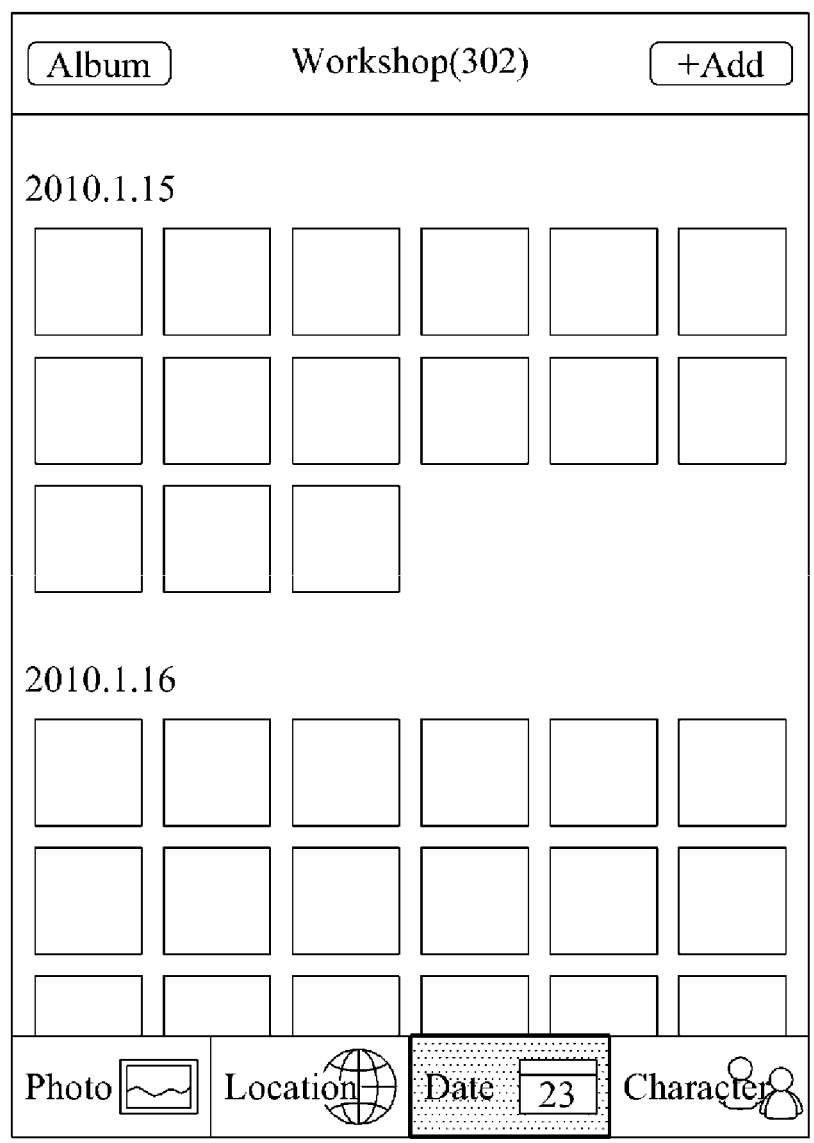
Figure 13:
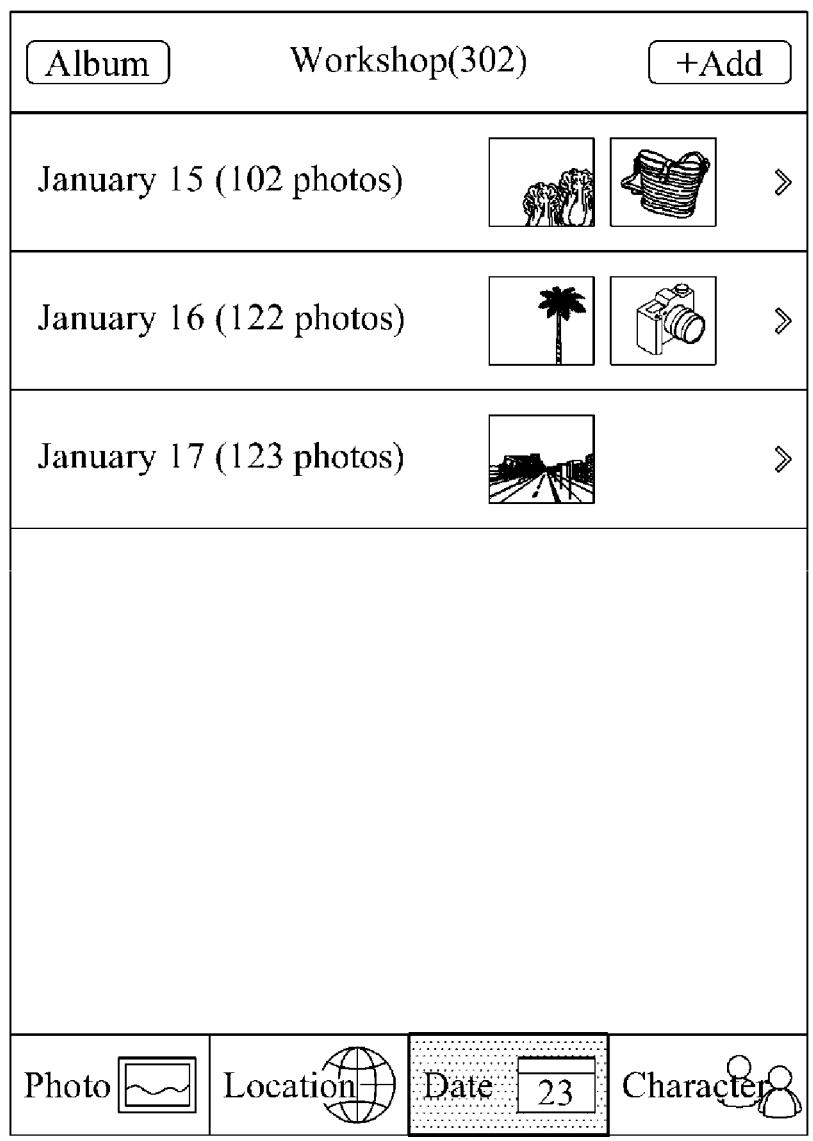

As illustrated in FIGS. 12 and 13, the management unit 220 may provide a date view for constructing albums based on dates, and automatically sort and display photos taken for each date, and the user may verify whether a respective photo was taken on the corresponding date by selecting a date unit. As yet another example, the management unit 220 may provide a viewer mode for classifying and displaying photos based on character information associated with the photo.

Figure 14:
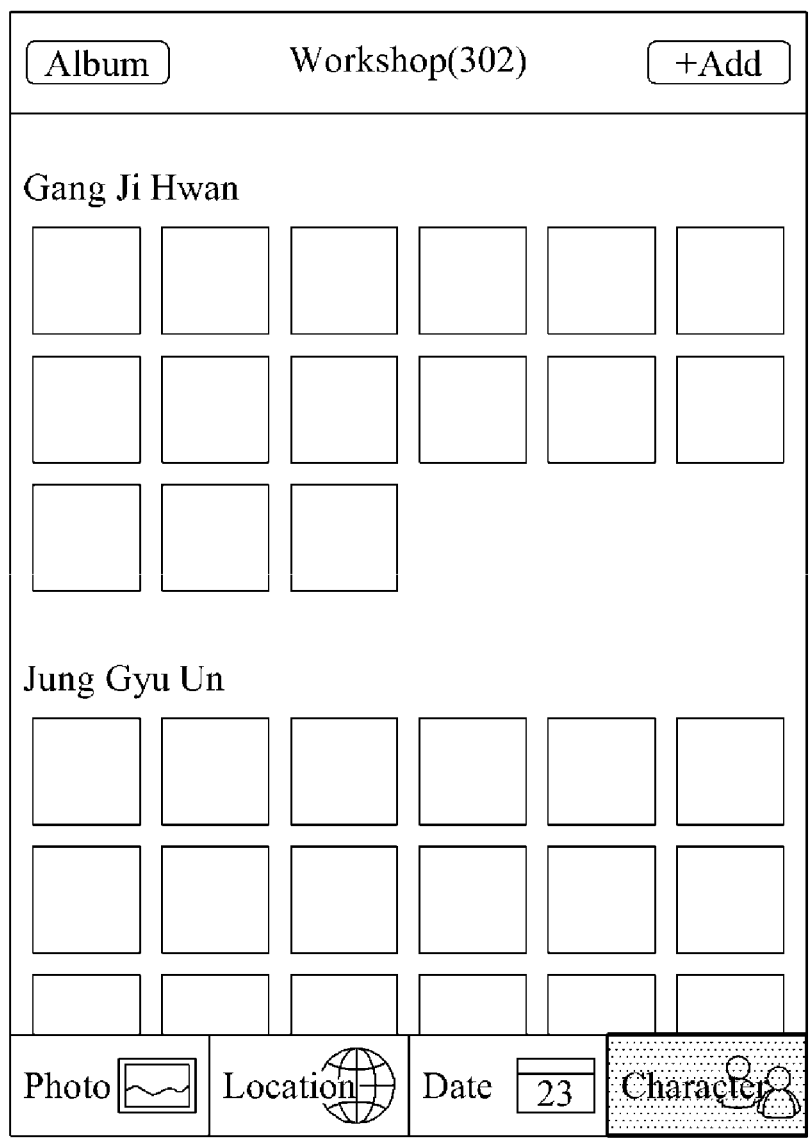
Figure 15:
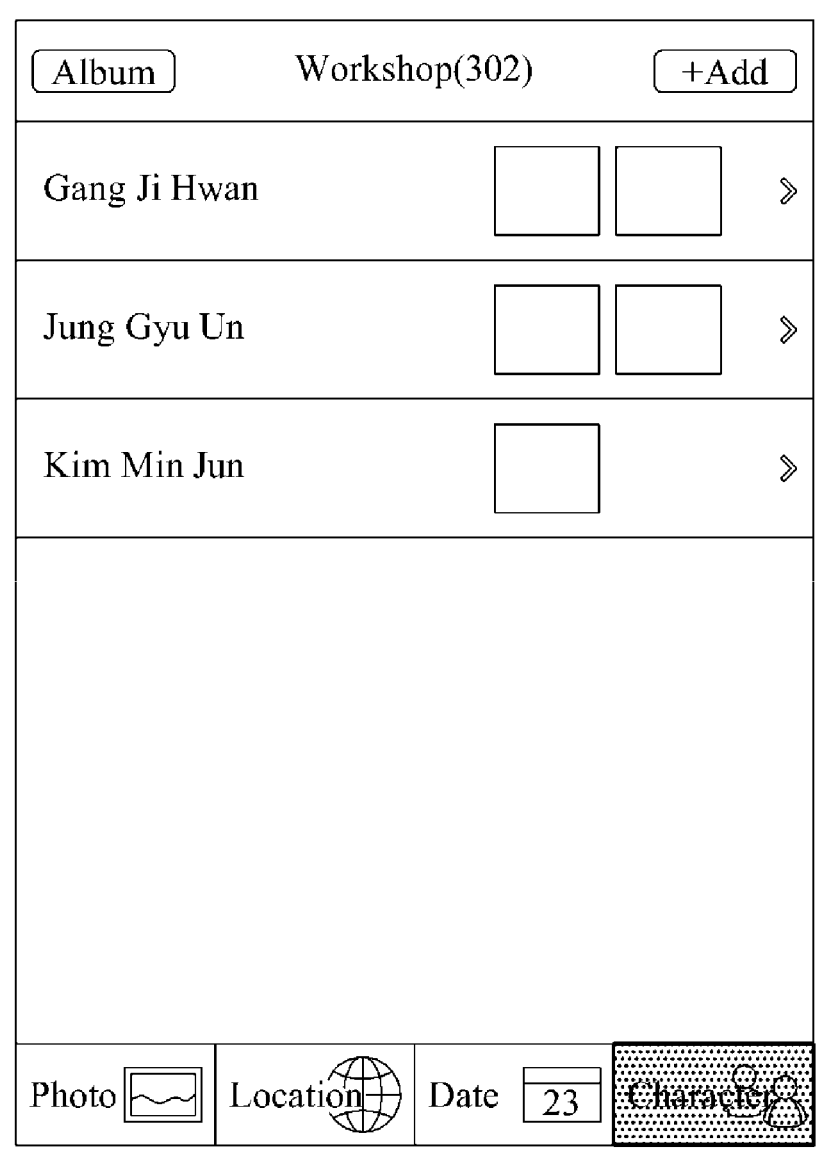

Referring to FIGS. 14 and 15, the management unit 220 may provide a character view for constructing albums character-by-character. Here, in the character view, the name of the friend closest to the corresponding character among friends of the user may be automatically recommended through the face recognition module for each photo, and the corresponding character may be automatically tagged when a result matches the corresponding character. Furthermore, in response to a manual selection of a friend in a photo, photos may be automatically sorted for each character in the album. In response, the user may select a character unit through the character view, and verify whether a photo corresponds to the character.

The management unit 220 may provide various forms of management modes and viewer modes using time information, location information, and character information of a photo in managing photos stored in the communication terminal album-by-album.

The loading unit 230 may load photos locally added and managed on the communication terminal onto the album management server corresponding to a host system. Furthermore, when the user sets an attribute of an album as shared with a friend when adding the album, the loading unit 230 may automatically load, onto the album management server, all photos added to the album whose attribute is set as shared with the friend. According to exemplary embodiments of the present invention, through a connection with the communication terminal, the album management server may manage photos of the user album-by-album, and perform a function of publishing an album whose attribute is set as shared with the friend, to the corresponding friend. That is, the album management server may grant an access permission to publish the corresponding album to a friend with whom the user allows sharing, so that the friend may share the album of the user. In this instance, the access permission may refer to at least one of a read permission and a write permission for an album. The write permission granted to a friend may include a permission to input interaction information or comment on an album or a photo contained in the album, a permission to add a photo to an album, and the like.

The editing unit 240 may perform a function of applying an editing element to an image on a per album basis. The editing unit 240 may apply a function associated with an editing element such as a size of an image, a color, an effect, a frame, adding a sticker, adding text, and the like, to an individual photo such as a photo taken by a camera, a photo imported from a camera roll, and the like. Further, in addition to applying an editing element of an image set by the user to an individual photo, the editing unit 240 may batch apply the corresponding editing element to all photos contained in the album by applying the corresponding editing element on a per album basis. For example, when a "Disney Pooh frame" is set to an album A, corresponding to photos of a baby, and a "retro filter" is set to an album B desired to be is displayed to friends in a retro style, the "Disney Pooh frame" may be batch applied to all photos added to the album A, and the "retro filter" may be batch applied to all photos added to the album B. When the user requests a card to be generated for a predetermined album, the editing unit 240 may batch attach all photos contained in the predetermined album to the card. That is, when a card such as an invitation, a business card, and the like, is generated using photos stored in the communication terminal, the photos may be attached to the card on a per album basis. When photos are desired to be shared with a friend using an e-mail, a messenger service, and the like, the photos may be attached to a message album-by-album, and be transmitted to the friend desiring to share the photos. According to exemplary embodiments of the present invention, the editing unit 240 may provide a function of generating a card using a plurality of photos to which an editing element of an image is applied album-by-album, and sending the card.

The feed unit 250 may perform a function of providing a user with update information for an album or a photo contained in the album through a connection with the album management server in real time. In this instance, the update information may be feed information generated by a friend who shares an album, and more particularly, information corresponding to at least one among an event that the friend viewed the album, an event that the friend edited the album, an event that the friend inputted interaction information to the album or a photo contained in the album, an event that the friend inputted a comment to the album or a photo contained in the album. The update information may include information corresponding to a feed element such as an event that the user is set to a target for sharing the album of the friend, an event that an album for which the user is set to the target for sharing is edited, and the like. That is, the album management server may notify update news for an album shared between the user and the friend, thereby providing a communication bus using the album as a medium. In response to receiving, from the album management server, update news for an album or a photo contained in the album, the feed unit 250 may provide the received update information to the communication terminal in a feed type or a push type. In this instance, the feed unit 250 may display the update information in a viewer mode for displaying an album or a photo contained in the album.

Figure 16:
FIGS. 16 and 17 are diagrams illustrating a feed environment for providing update news of an album shared with a friend according to exemplary embodiments of the present invention.
Figure 17:
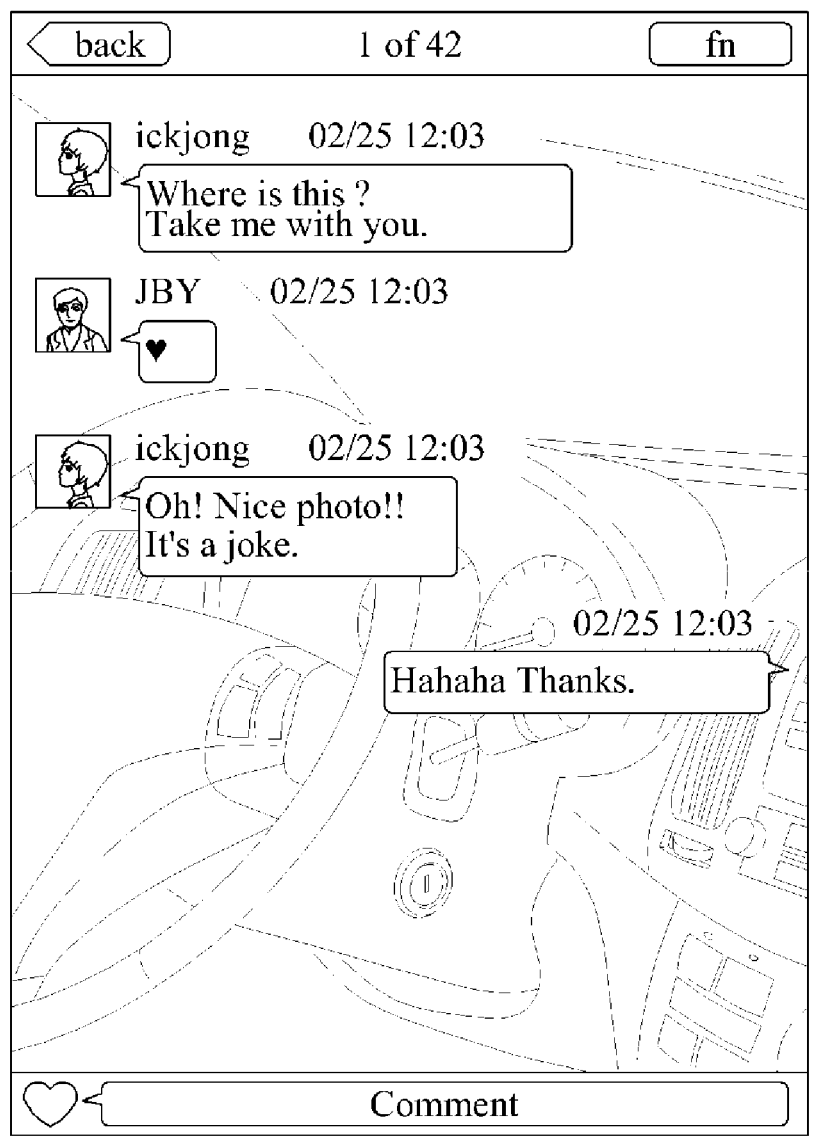

FIGS. 16 and 17 are diagrams illustrating a feed environment for providing update news of an album shared with a friend according to exemplary embodiments of the present invention. As an example, referring to FIG. 16, the feed unit 250 may provide an "album feed" page that provides update information in a service screen associated with an album management service. For example, the "album feed" page illustrated in FIG. 16 may display an event that a friend viewed the album for the first time, an event that a friend added a photo to an album, an event of an interactive action, for example, "like" input, by friends, to a predetermined photo in an album, an event of a comment input by friends to a predetermined photo in an album, an event that a friend designated the user as a target for sharing a predetermined album of the user, and the like. As another example, referring to FIG. 17, in a viewer mode for displaying a predetermined photo contained in an album, in response to a feedback message such as an interactive action, a comment, and the like, for the predetermined photo received from a friend, the feed unit 250 may display the feedback message on a screen of the viewer mode. As illustrated in FIG. 17, the feed unit 250 may sort feedback messages so that the latest input feedback message may be placed at the bottom of feedback messages on the screen. In this instance, the feed unit 250 may display a feedback message received from a friend on the left side of the screen, and display a feedback message input by the user on the right side of the screen.

Figure 18:
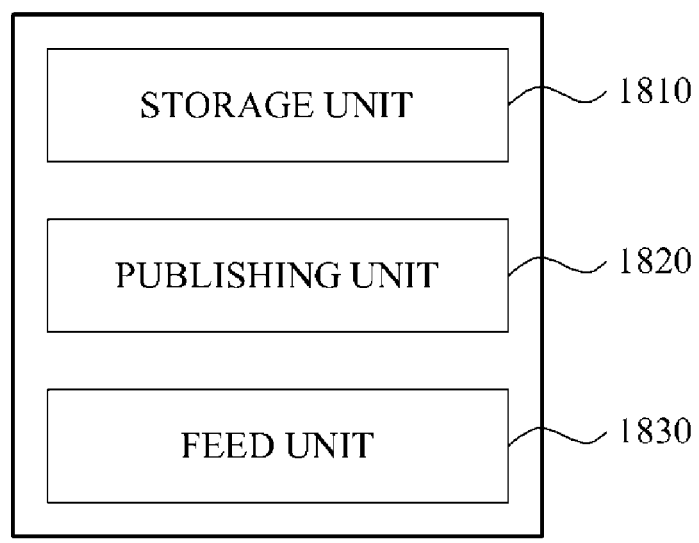
FIG. 18 is a block diagram illustrating an internal configuration of an album management server that maintains and manages a photo stored in a communication terminal on a per album basis, and publishes an album, set to be shared by a user, to another person according to exemplary embodiments of the present invention.

FIG. 18 is a block diagram illustrating an internal configuration of an album management server that maintains and manages photos stored in a communication terminal album-by-album, and publishes an album, set to be shared by a user, to another person according to exemplary embodiments of the present invention. Referring to FIG. 18, an album management server 1800 according to exemplary embodiments of the present invention may include a storage unit 1810, a publishing unit 1820, and a feed unit 1830.

The storage unit 1810 may receive photos album-by-album from a communication terminal of a user, and store the received photos to be associated with the corresponding album. In this instance, the communication terminal may automatically load, onto the album management server 1800, locally added and managed photos. In particular, in an event that the user sets a target, for example, a friend for sharing an album with when adding the album to the communication terminal, the communication terminal may automatically load, onto the album management server 1800, all photos added to the album whose attribute is set to be shared. That is, the storage unit 1810 may be loaded, album-by-album, with photos classified and managed album-by-album in the communication terminal, and store and maintain the photos. In this instance, the storage unit 1810 may classify and manage, in a folder, an album to which photos are added in response to a request from the user. The storage unit 1810 may provide album management of at least two depths through an album management structure that may sort and classify the albums.

The publishing unit 1820 may publish an album by granting an access permission to the album to a designated friend in response to the user's designation of a list of friends to share the album. In this instance, the access permission may refer to at least one of a read permission and a write permission for an album or a photo contained in the album. The publishing unit 1820 may provide a viewer mode for an album to the user and a friend with whom the user allows sharing. That is, as described with reference to FIGS. 10 through 15, the publishing unit 1820 may provide the user and a friend with various types of viewer modes such as a general photo view, a location view, a date view, a character view, and the like. In response, the user may access an album stored in a server, and verify a photo added to an album through the general photo view, the location view, the date view, the character view, and the like. A write permission granted to a friend may include a permission to input interaction information or comment on an album or a photo contained in the album, a permission to add a photo to an album, and the like. The publishing unit 1820 may provide a friend with whom the user allows sharing with a function of editing or adding a photo contained in an album, a function of adding a target for sharing an album, a function of inputting interaction information or a comment to an album or a photo contained in the album in a viewer mode for displaying a photo on a per album basis.

The feed unit 1830 may perform a function of providing update information for an album or a photo contained in the album between the user and a friend, for example, between users sharing the album in real time. In particular, the feed unit 1830 may provide, through a feed or push, update information corresponding to a feed element such as an event that the user set a target for sharing a predetermined album, an event that an album which the user set as the target for sharing was edited, an event that a friend viewed an album for the first time, an event that a friend edited an album, an event that a friend added a photo to an album, an event that a friend inputted interaction information to an album or a photo contained in the album, an event that a friend inputted a comment to an album or a photo contained in the album, and the like, in real time. According to the album management structure described in the foregoing, another designated user may add a photo to an album set to albums shared with a friend and thus, update news, that is, newly added photo information, and the like may be provided to a user with a permission to access the album in response to the other designated user adding a new photo. Further, update news may be provided to users through a feed, a push, and the like, in response to a comment posted on a photo or a guest book in the joint album, in response to "like" corresponding to an interactive action, or in response to a comment, "like," and the like input, by another member, to a photo to which the user inputs a comment or "like". That is, the feed unit 1830 may notify users of update news for an album shared between the users in real time, thereby providing active communication between users by using the album as a medium. A function of providing update information between the user and a friend, in real time described in the foregoing may be provided as a portion of a function of a photo album app, or as an individual service model.

According to the album management structure described in the foregoing, an album management system according to exemplary embodiments of the present invention may add and manage locally saved photos by default album-by-album, and may load, into an album management server, a photo on a per album basis to share the photo of the user with a friend desired by the user.

Figure 19:
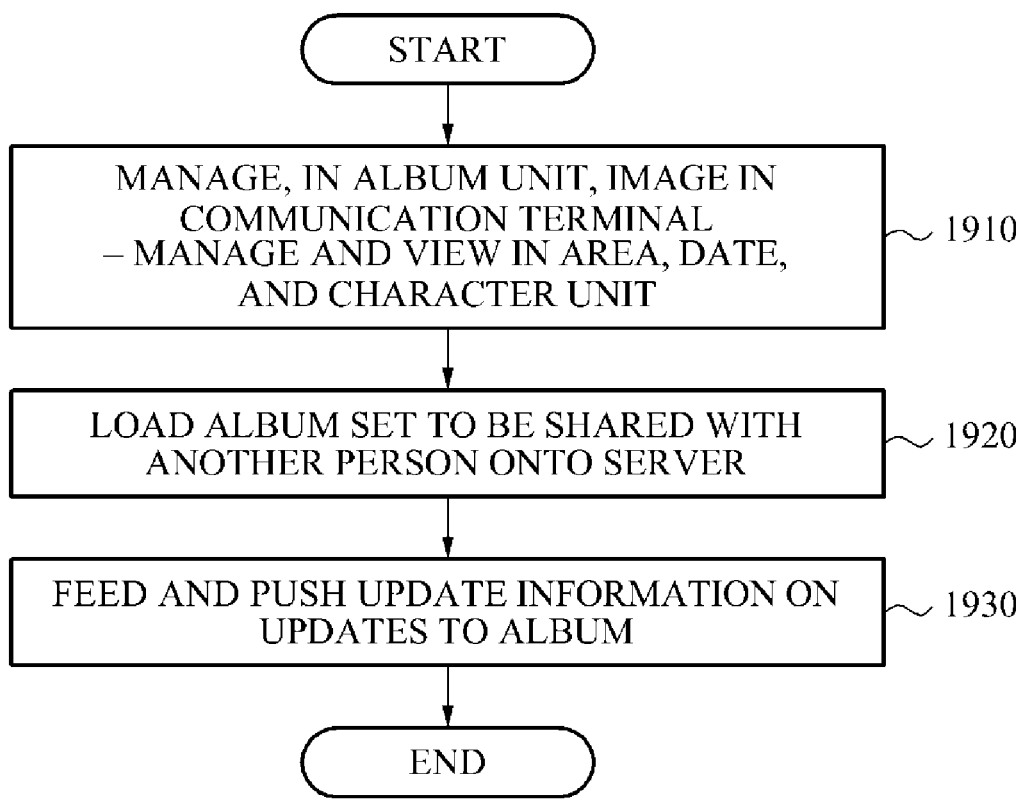
FIG. 19 is a flowchart illustrating a method of managing an album in a communication terminal that locally manages photos album-by-album, and shares the photos with a friend according to exemplary embodiments of the present invention.

FIG. 19 is a flowchart illustrating a method of managing an album in a communication terminal that locally manages photos album-by-album, and shares a photo with a friend according to exemplary embodiments of the present invention. Each operation of the method of managing an album according to exemplary embodiments of the present invention may be performed by the communication terminal 200 described with reference to FIG. 2.

In operation 1910, the communication terminal 200 may manage, album-by-album, a photo stored in a terminal. The communication terminal 200 may generate an album for managing a photo in response to a request from a user, and then add, to the album, and manage a plurality of photos desired by the user. In this instance, the communication terminal 200 may receive, from the user, an input of a list of friends to share the album when generating the album, and set whether the album is to be published. In addition to classifying a photo album-by-album, the communication terminal 200 may provide a management mode in various schemes using time, location, and character information associated with the photo. As an example, the communication terminal 200 may provide a management mode for moving, to a predetermined album, a photo selected, by the user, from a full list of photos stored in the communication terminal by providing the full list. As another example, the communication terminal 200 may provide a management mode for classifying and displaying photos region-by-region based on location information associated with the photo, and moving, in response to the user's selection of the region, a photo from the selected region to a predetermined album. In this instance, a map screen for receiving a selection of a region from the user may be provided in the management mode based on the region. As a still another example, the communication terminal 200 may provide a management mode for classifying and displaying photos date-by-date based on time information associated with the photo, and moving, in response to the user's selection of a predetermined date unit, a photo on the selected date unit to a predetermined album. In this instance, in the management mode based on the date unit, a date unit screen for receiving a selection of a date unit, among a year unit, a month unit, a week unit, and a day unit, may be provided. In the management mode based on the date unit, in response to the user's selection of a date unit, a list of photos corresponding to the selected date unit may be provided, and a photo selected, by the user, from the list of photos, that is, a desired photo in a predetermined date unit may be moved to an album. As yet another example, the communication terminal 200 may provide a management mode for classifying and displaying photos on a per character basis based on character information associated with the photo, and moving, in response to the user's selection of a predetermined character unit, the photo in the selected character unit to a predetermined album. The communication terminal 200 may provide a viewer mode for an album through various view types such as a general photo view, a location view, a date view, a character view, and the like. That is, the communication terminal 200 may provide a general photo view for classifying and displaying photos on a per album basis added by the user, a location view for classifying and displaying photos region-by-region based on location information, for example, GPS information associated with the photo, a date view for classifying and displaying photos date-by-date based on time information associated with the photo, and a character view for classifying and displaying photos on a per character basis based on character information associated with the photo. The communication terminal 200 may classify and manage, in a folder, an album having a classified photo. That is, the communication terminal 200 may manage an album of at least two depths through an album management structure that may sort and classify an album unit. Thus, the communication terminal 200 may provide various forms of management modes and viewer modes using time information, location information, and character information of a photo stored in the communication terminal 200 in managing the photo on a per album basis. Further, the communication terminal 200 may apply an editing element to an image album-by-album. In addition to applying a function associated with an editing element such as a size of an image, a color, an effect, a frame, adding a sticker, adding text, and the like, to an individual photo, the communication terminal 200 may batch apply the corresponding editing element to all photos contained in an album by applying the corresponding editing element to an album unit. When the user requests a card to be generated for a predetermined album, the communication terminal 200 may batch attach all photos contained in the predetermined album to the card. That is, according to exemplary embodiments of the present invention, when a card such as an invitation, a business card, and the like is generated using a photo stored in the communication terminal 200, a function of attaching, to the card, and sending the photo on a per album basis may be provided.

In operation 1920, the communication terminal 200 may concurrently load, into an album management server corresponding to a host system, photos locally added and managed on the communication terminal 200. In particular, when the user sets an attribute of an album as shared with a friend when adding the album, the communication terminal 200 may automatically load all photos added to the album whose attribute is set to be sharing with the friend into the album management server. An album loaded into the album management server may be shared between friends by granting an access permission to a friend with whom sharing is allowed to publish the album.

In operation 1930, the communication terminal 200 may provide the user with update information for an album or a photo contained in the album through a connection with the album management server, in real time. In particular, the communication terminal 200 may provide, in a feed type or a push type, update information corresponding to a feed element among an event that a friend views the album, an event that the friend edits the album, an event that the friend inputs interaction information to the album or a photo contained in the album, an event that the friend comments on the album or a photo contained in the album, an event that the user is set to a target for sharing the album of the friend, an event that an album for which the user set as the target for sharing is edited, and the like in response to receiving the update information from the album management server. The communication terminal 200 may display the update information in a viewer mode for displaying an album or a photo contained in the album.

Figure 20:
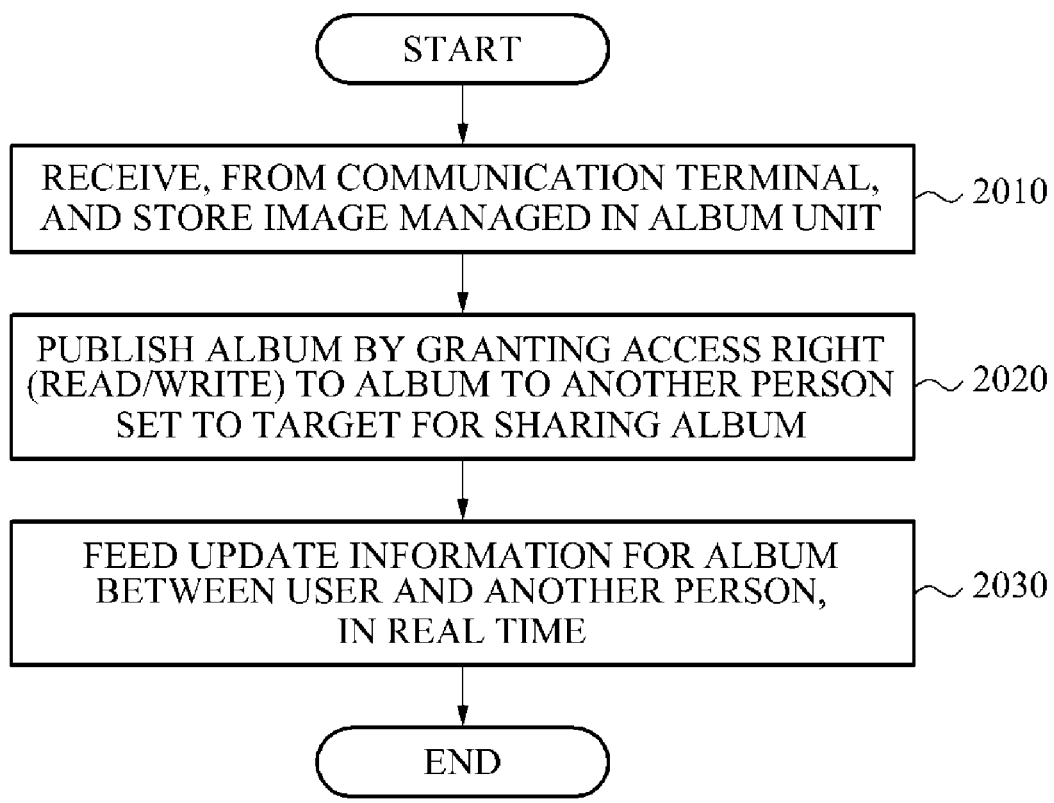
FIG. 20 is a flowchart illustrating a method of managing an album in an album management server that maintains and manages a photo stored in a communication terminal on a per album basis, and publishes an album, set to be shared by a user, to another person according to exemplary embodiments of the present invention.

FIG. 20 is a flowchart illustrating a method of managing an album in an album management server that maintains and manages a photo stored in a communication terminal on a per album basis, and publishes an album, set to be shared by a user, to another person according to exemplary embodiments of the present invention. Each operation of the method of managing an album according to exemplary embodiments of the present invention may be performed by the album management server 1800 described with reference to FIG. 18.

In operation 2010, the album management server 1800 may receive, from a communication terminal of a user, a photo on a per album basis, and store the received photo to be associated with the corresponding album. In this instance, the communication terminal may automatically load, into the album management server 1800, locally added and managed photos. In particular, in an event that the user sets a target, for example, a friend for sharing an album when adding the album to the communication terminal, the communication terminal may automatically load, into the album management server 1800, all photos added to the album whose attribute is set to be shared. That is, the album management server 1800 may be loaded, album-by-album, with a photo classified and managed album-by-album in the communication terminal, and store and maintain the album.

In operation 2020, the album management server 1800 may publish the album by granting an access permission to the album to a designated friend in response to the user designating a list of friends to share the album. In this instance, the access permission may refer to at least one of a read permission and a write permission for an album or a photo contained in the album. The album management server 1800 may provide the user and a friend with whom sharing is allowed with various types of views such as a general photo view, a location view, a date view, a character view, and the like. In response, users may access an album stored in a server, and verify a photo added to the album through the general photo view, the location view, the date view, the character view, and the like. A write permission granted to a friend may include a permission to input interaction information or a comment to an album or a photo contained in the album, a permission to add a photo to an album, and the like.

In operation 2030, the album management server 1800 may provide update information for an album or a photo contained in the album between users sharing the album, in real time. In particular, the album management server 1800 may provide, through a feed or push, users with update information corresponding to a feed element such as an event that the user is set to a target for sharing a predetermined album, an event that an album for which the user is set to the target for sharing is edited, an event that a friend views an album for the first time, an event that a friend edits an album, an event that a friend adds a photo to an album, an event that a friend inputs interaction information to an album or a photo contained in the album, an event that a friend inputs a comment to an album or a photo contained in the album, and the like, in real time. In this instance, the album management server 1800 may display the update information in a viewer mode for displaying an album or a photo contained in the album. Accordingly, the album management server 1800 may notify users of update news for an album shared between the users, in real time, thereby providing active communication using the album as a medium.

As described in the foregoing, according to exemplary embodiments of the present invention, by adding and managing, album-by-album, a photo stored in a communication terminal, it is possible to effectively and easily manage a photo in the communication terminal. Further, according to exemplary embodiments of the present invention, by employing a scheme of storing and managing a locally saved photo of a communication terminal by default, and a photo stored in communication terminal is loaded into a server, it is possible to extend an album management service through a connection between a local entity and service. According to exemplary embodiments of the present invention, by sharing, album-by-album, a photo with friends, and providing update information for an album shared between the user and a friend, it is possible to provide communication using the album as a medium. Further, according to exemplary embodiments of the present invention, in managing a photo on a per album basis, a relatively easy management environment in various schemes may be provided using time, location, and character information contained in the photo, and a management service in a new scheme may be provided by batch applying, album-by-album, a function of setting for sharing an album, a function of editing an image, a function of generating a card, and the like.

Exemplary embodiments of the present invention may include computer-readable media including program instructions to implement various operations embodied by a computer. In particular, exemplary embodiments of the present invention may provide a recording medium storing a program including a management code to classify and manage a photo on a per album basis, a loading code to load, into a server corresponding to a host system associated with the program, a photo contained in an album album-by-album in response to a user setting for sharing the album with a friend, and a feed code to receive, from the server in real time, update information on updates to the album or an image contained in the album being performed by the friend, and provide the update information to the user. The program according to exemplary embodiments of the present invention may be constructed by a PC-based program, an application dedicated to a mobile terminal, for example, a smart phone application, a feature phone VM, and the like.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, it is possible to effectively and easily manage photos within a communication terminal by adding and managing photos stored in the communication terminal on a per album basis.

According to exemplary embodiments of the present invention, it is possible to extend an album management service through a connection between a local entity and a server by concurrently applying a scheme of storing and managing locally saved photos of a communication terminal, and a scheme of putting, on a server, photos stored in the communication terminal.

According to exemplary embodiments of the present invention, it is possible to provide a management environment in convenient and various schemes by utilizing information about time, location, and character for managing photos on a per album basis.

According to exemplary embodiments of the present invention, it is possible to provide a management environment in a convenient and new scheme by batch applying, album-by-album, a function of setting a sharing of photos, a function of editing an image, a function of generating a card, and the like.

According to exemplary embodiments of the present invention, it is possible to perform an active communication by providing update information in real time for an album shared between a user and a friend.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A communication terminal, comprising:
   a storage device;
   a management unit configured to manage images stored on the storage device, album-by-album; and
   a loading unit configured to load images contained in an album into a server corresponding to a host system on a per album basis in response to a user's setting of sharing attribute of the album as shared with another person,
   wherein an access permission to the album is granted to the another person so that the another person shares the album with the user,
   the management unit is configured to provide a management mode for classifying an image region-by-region based on location information associated with the image, and moving, in response to the user's selection of the region, an image from the selected region to the album, and
   the management mode is configured to provide a map screen for receiving a selection of the region from the user.

2. The communication terminal of claim 1, further comprising:
   a generator to generate the album in response to a request from the user,
   wherein the generator is configured to receive, from the user, an input of list of other people to share the album, and store the list of other people to be associated with the album.

3. The communication terminal of claim 1, wherein the management unit is configured to provide a management mode for moving, to the album, an image selected by the user from a list of images.

4. The communication terminal of claim 1, wherein:
   the management unit is configured to provide a management mode for classifying an image date-by-date based on time information associated with the image, and moving, in response to the user's selection of a date unit, an image from the selected date unit to the album, and
   the management mode is configured to provide a date unit screen for receiving a selection of the date unit among at least one of a year unit, a month unit, a week unit, and a day unit.

5. The communication terminal of claim 4, wherein the management unit is configured to provide, in response to the user's selection of the date unit, a list of images corresponding to the selected date unit, and move, to the album, an image selected by the user from the list of images.

6. The communication terminal of claim 1, wherein the management unit is configured to provide a management mode for classifying an image character-by-character based on character information associated with the image, and moving, in response to the user's selection of a character unit, an image from the selected character unit to the album.

7. The communication terminal of claim 1, wherein the management unit is configured to provide at least one of
   a viewer mode for displaying an image album-by-album,
   a viewer mode for classifying and displaying an image region-by-region based on location information associated with the image,
   a viewer mode for classifying and displaying an image date-by-date based on time information associated with the image, or
   a viewer mode for classifying and displaying an image character-by-character based on character information associated with the image.

8. The communication terminal of claim 1, further comprising:
   an editing unit configured to apply an editing element to an image album-by-album,
   wherein the editing unit is configured to receive, from the user, an input of the editing element for the album among at least one of a size of an image, a color, an effect, a frame, adding a sticker, adding text, and batch apply the editing element to an image contained in the album.

9. The communication terminal of claim 1, further comprising:
   a feed unit configured to provide update information in real time for the album or an image contained in the album.

10. The communication terminal of claim 9, wherein the update information corresponds to at least one among an event that the another person viewed the album, an event that the another person edited the album, an event that the another person inputted interaction information to the album or an image contained in the album, an event that the another person inputted a comment to the album or an image contained in the album, an event that the user is set to a target for sharing the album of the another person, and an event that an album for which the user is set to the target for sharing was edited.

11. The communication terminal of claim 9, wherein the feed unit is configured to display the update information in a viewer mode for displaying the album or an image contained in the album.

12. A method using a processor of managing an album in a communication terminal, the method comprising:
   managing, by the processor, images album-by-album;
   loading, into a server corresponding to a host system, images contained in an album album-by-album in response to a user setting for sharing the album with another person;
   receiving, from the server in real time, update information on updates to the album or an image contained in the album performed by the another person;
   providing the update information to the user;
   providing a management mode for classifying an image region-by-region based on location information associated with the image;
   moving, in response to the user's selection of the region, an image from the selected region to the album; and
   providing a map screen for receiving a selection of the region from the user.

13. The method of claim 12, wherein the managing comprises providing at least one of a management mode for moving, to the album, an image selected by the user from a list of images, a management mode for classifying an image region-by-region based on location information associated with the image, and moving, to the album, an image of the region selected by the user, a management mode for classifying an image date-by-date based on time information associated with the image, and moving, to the album, an image of the date unit selected by the user, or a management mode for classifying an image character-by-character based on character information associated with the image, and moving, to the album, an image of the character unit selected by the user.

14. The method of claim 12, wherein managing comprises providing at least one of a viewer mode for displaying an image album-by-album, a viewer mode for classifying and displaying an image region-by-region based on location information associated with the image, a viewer mode for classifying and displaying an image date-by-date based on time information associated with the image, or a viewer mode for classifying and displaying an image character-by-character based on character information associated with the image.

15. The method of claim 12, further comprising:
   receiving, from the user, an input of the editing element for the album among at least one of a size of an image, a color, an effect, a frame, adding a sticker, adding text, or batch applying the editing element to an image contained in the album.

16. The method of claim 12, wherein receiving the update information comprises:
   receiving, in a scheme of at least one of a feed type and a push type, update information corresponding to at least one among an event that the another person viewed the album, an event that the another person edited the album, an event that the another person inputted interaction information to the album or an image contained in the album, an event that the another person inputted a comment to the album or an image contained in the album, an event that the user is set to a target for sharing the album of the another person, and an event that an album for which the user is set to the target for sharing is edited in response to receiving the update information from the server.

17. The method of claim 12, wherein providing the update information comprises displaying the update information in a viewer mode for displaying the album or an image contained in the album.

18. A non-transitory computer-readable recording medium storing an executable program to manage images stored in a communication terminal such that the program, when executed causes the computer to perform:
   classifying and managing images album-by-album;
   loading, into a server associated with the program, images contained in an album album-by-album in response to a user setting for sharing the album with another person;
   receiving, from the server in real time, update information on updates to the album or an image contained in the album being performed by the another person;
   providing the update information to the user;
   providing a management mode for classifying an image region-by-region based on location information associated with the image;
   moving, in response to the user's selection of the region, an image from the selected region to the album; and
   providing a map screen for receiving a selection of the region from the user.

* * * * *